United States Patent [19]
Mooradian et al.

[11] Patent Number: 5,871,279
[45] Date of Patent: Feb. 16, 1999

[54] DURABLE TYMPANIC PROBE AND THERMOMETER

[75] Inventors: Mark Mooradian, San Diego; Ivanhoe Chaput, Redondo Beach; Philip Simpson, Escondido, all of Calif.

[73] Assignee: Thermoscan, Inc., San Diego, Calif.

[21] Appl. No.: 958,881

[22] Filed: Oct. 27, 1997

Related U.S. Application Data

[63] Continuation of Ser. No. 494,017, Jun. 23, 1995, abandoned.

[51] Int. Cl.⁶ .................................................. G01J 5/08
[52] U.S. Cl. ........................ 374/130; 374/131; 600/474; 600/549
[58] Field of Search ................... 374/130, 131; 600/549, 474

[56] References Cited

U.S. PATENT DOCUMENTS

| | | | |
|---|---|---|---|
| 3,355,181 | 11/1967 | Olson | 277/180 |
| 4,895,164 | 1/1990 | Wood | 128/736 |
| 4,932,789 | 6/1990 | Egawa et al. | 374/130 |
| 5,012,813 | 5/1991 | Pompei et al. | 374/130 |
| 5,018,872 | 5/1991 | Suszynski et al. | 374/133 |

FOREIGN PATENT DOCUMENTS

| | | | |
|---|---|---|---|
| 404141138 | 5/1992 | Japan | 128/736 |
| 406063023 | 3/1994 | Japan | 128/736 |
| 406090909 | 4/1994 | Japan | 128/736 |
| 92010133 | 6/1992 | WIPO | 128/736 |

*Primary Examiner*—Diego F.F. Gutierrez
*Assistant Examiner*—Andrew Hirshfeld
*Attorney, Agent, or Firm*—Hopgood, Calimafde, Kalil, Judlowe

[57] ABSTRACT

A durable tympanic thermometer that resists damage from a drop comprises an IR thermometer probe having a reinforced speculum for reception within a human ear near the tympanum, a metal brick holding the probe to the body of the infrared thermometer, a barrel within the speculum acting as an infrared waveguide, an insulating and shock absorbing seal surrounding the barrel, a window within the barrel remote from the end of the speculum nearest the tympanum, a thermometer housing, an infrared responsive sensor, and electrical components to translate and display a sensor-generated signal into a visible temperature reading.

15 Claims, 2 Drawing Sheets

DURABLE TYMPANIC PROBE AND THERMOMETER

This application is a continuation of application Ser. No. 494,017, filed Jun. 23, 1995, now abandoned.

FIELD OF THE INVENTION

The present invention relates to a temperature measurement device probe used in diagnostic and therapeutic treatment. More particularly, the present invention relates to the use of a specialized probe configured to provide a more durable thermometer capable of performing its functions substantially unimpaired by predicable physical abuse, such as being dropped from three feet to the ground.

BRIEF DESCRIPTION OF THE PRIOR ART AND BACKGROUND OF THE INVENTION

Recent progress has been made in developing systems for tympanic membrane temperature measurement. By way of background, mammalian temperature has long been of keen interest to doctors and others involved in diagnosis and treatment of patient pathologies. On the other hand, accurate temperature measurement, accomplished in a quick, non-intrusive and inexpensive manner has remained a considerable task. Measuring the temperature of the tympanic membrane of the ear has been found to provide a highly accurate body temperature reading. By collecting the infrared emissions from the tympanic membrane, an accurate temperature reading can be ascertained in an non-intrusive procedure.

As stated above, many systems have been proposed for temperature measurement based on tympanic IR emissions. Exemplary patents in this field include U.S. Pat. No. 4,895,164 to Wood, 4,797,840 to Jacob Praden, Ph.D. and U.S. Pat. No. 5,199,436 to Pompei, et al.; the contents of these patents are incorporated herein by reference. These systems vary in both accuracy and complexity, but in large have been found to be very useful for their intended purposes, and are now enjoying commercial popularity. Notwithstanding these past successes, a common and significant handicap resides with even the most expensive of these systems. This handicap relates to the durability of tympanic thermometers in connection with predicable wear and tear. Referring to FIG. 1, which shows a typical fragile probe 100, the most vulnerable component of such tympanic thermometers is the probe, or nose portion intended for insertion in the ear channel. The vulnerability stems from its necessary protuberance coupled with the sensitivity of several components within the probe, specifically the barrel 102, or wave guide, and the attached window 104.

Typically, dropping an infrared tympanic thermometer from a height as low as one foot can destroy the thermometer's ability to read temperatures accurately, or completely. In a fall of one foot, tympanic thermometers typically sustain bending of the barrel or IR wave guide, and/or braking of the window at the remote end 106 of the barrel 102. Broken windows constitute the primary reason for customer dissatisfaction with tympanic thermometers.

Previous designs placed a hard window on top of and covering the end 106 of the barrel 102. This exposed the window 104, with little or no protection, to damage by placing it closer to the point of impact 108 in a nose-first fall. The composition of the speculum 110, or funnel shaped portion that supports the thermal sensing components within the ear channel, further contributing to the problem of fragility. Typically the speculum is composed of non-reinforced polycarbonate that will dent at the tip 112 and cause the window 104 to break. When the speculum flexes during a drop, most of the force of the fall translates from the speculum through a solid rubber seal 114 to the barrel 102, and can cause barrel bending and subsequent thermometer inaccuracy. This seal 114 serves to prevent cleaning fluids from running down the outside of the barrel 102 and degrading the performance of the thermometer due to evaporative cooling.

Mechanical energy of a fall tends to deform the speculum 110, the barrel 102 and the window 104, in part because the front brick 116 is not directly connected to the speculum 110. Such direct connection would allow some of the energy to dissipate through the housing of the thermometer and away from the speculum 110, barrel 102, and window 104.

OBJECTS AND SUMMARY OF THE INVENTION

It is, therefore, an object of the invention to provide a more durable probe for use with an IR tympanic thermometer, capable of withstanding repeated falls from a height as high as three feet.

It is a further object to provide a speculum of a more rigid material that resists deformation and thus protects both the window and waveguide from damage.

It is a further object to provide a seal between the waveguide and the speculum that thermally isolates the waveguide, stops evaporative cooling fluids from reaching the waveguide, and also absorbs, rather than translates, mechanical energy created by an impact of the speculum against another object or surface, such as hitting the floor after the thermometer is dropped.

It is a further object to provide a nose with a window of sufficient thickness and placed within the barrel, rather than adjacent to its end, and further to place the window recessed from the speculum tip, so as to allow the rim of the speculum to protect the window in a nose-first fall, and to employ an energy absorbing adhesive to mount the window within the barrel such that a hermetic seal between the window and barrel is maintained despite the mechanical deformation of the speculum during a nose-first fall.

The invention realizes these objects and others in a novel infrared tympanic thermometer probe having several improvements that work together to protect the critical components of the thermometer. A rigid and reinforced speculum resists deformation under significant stress. Direct connection of the rigid speculum to the brick channels impact stress away from the nose to less critical thermometer areas. A non-solid thermally insulating seal between the speculum and the barrel protects the barrel by precluding the translation of mechanical energy from a flexing or deforming speculum to the barrel. Placing the window within the barrel and inwardly from the rim of the speculum protects the window from breakage and misalignment. The improved thermometer is more robust and resilient than conventional tympanic thermometers, and continues to perform optimally even after sustaining impact with the ground or a hard surface from a height of three feet. Conventional tympanic thermometers can break or sustain performance-diminishing damage from falls as low as one foot. By mechanically and thermally isolating the barrel from the rigid speculum, and protecting the thick window by placement within both the speculum and the barrel, the invention greatly reduces the problem of stress-induced barrel and window deformation. Thus, the invention is durable and continues to give accurate tympanic temperature measurement even after physical stress that would render conventional tympanic thermometers useless.

The foregoing features of the present invention may be more fully appreciated in the specific illustrative embodiment as described below in conjunction with the following drawings:

DETAILED DESCRIPTION OF THE ILLUSTRATIVE EMBODIMENTS

The present invention presents a more durable probe or nose portion of a tympanic infrared thermometer. Tympanic infrared thermometers rapidly and accurately read human body temperature by measuring the thermal energy radiating from the tympanic membrane inside the ear channel from a probe, ideally sheathed in a hygienic, disposable cover, as described in U.S. Pat. No. 5,088,834 to Howe, et.al. When combined with the inventive probe, the thermometer can withstand physical wear and tear such as being dropped from a height of three feet and still function without loss of accuracy or precision. The invention achieves this result by altering the configuration and composition of several probe components.

Figure 1:
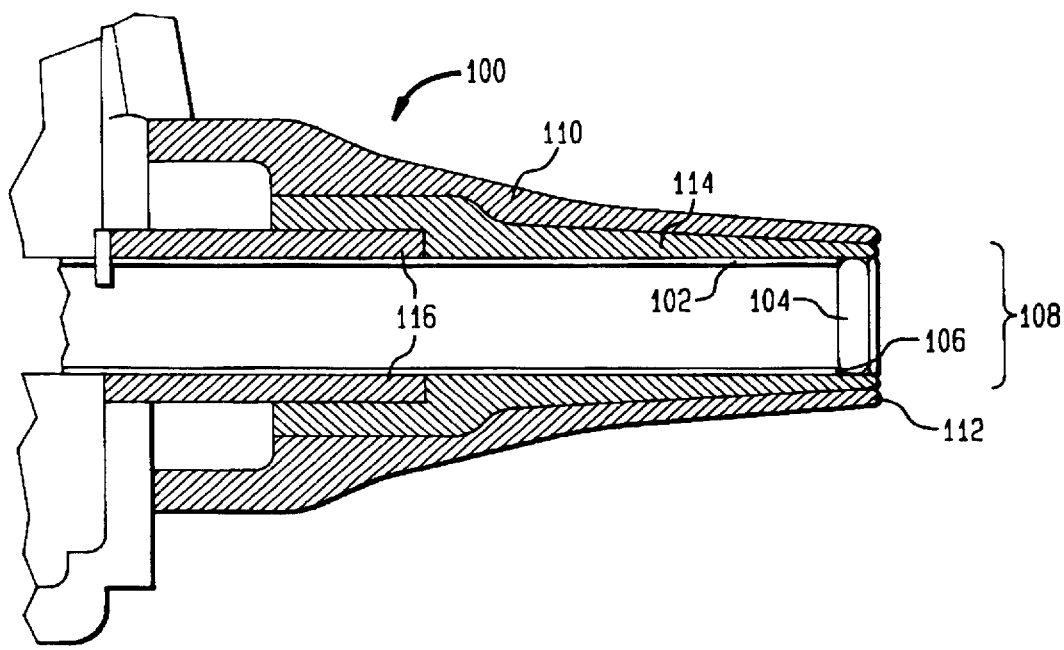
FIG. 1 depicts a typical probe as presented by the prior art.
Figure 2A:
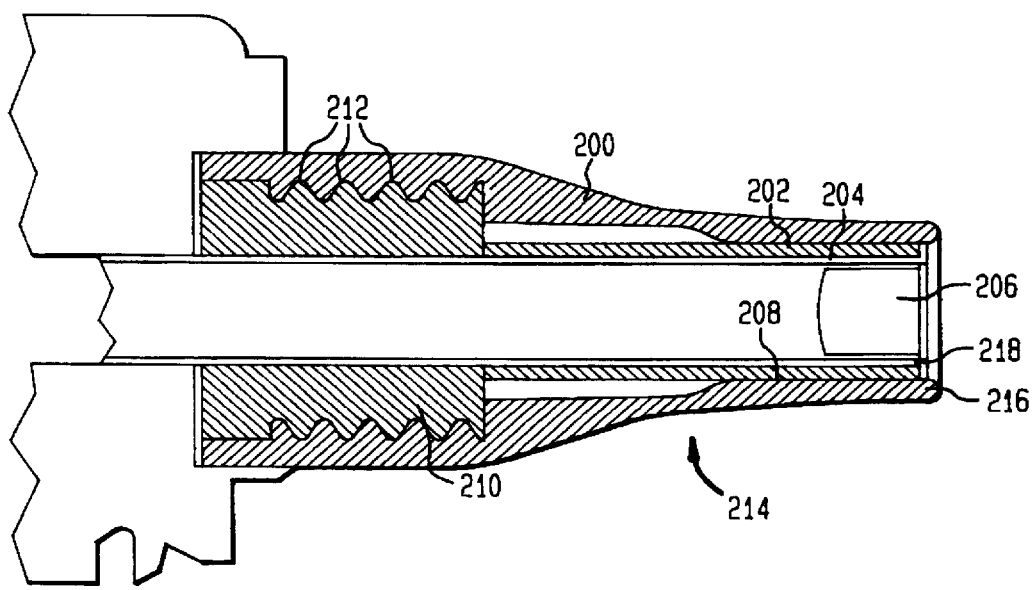
FIG. 2(a) depicts a cross-sectional view of the inventive probe.
Figure 2B:
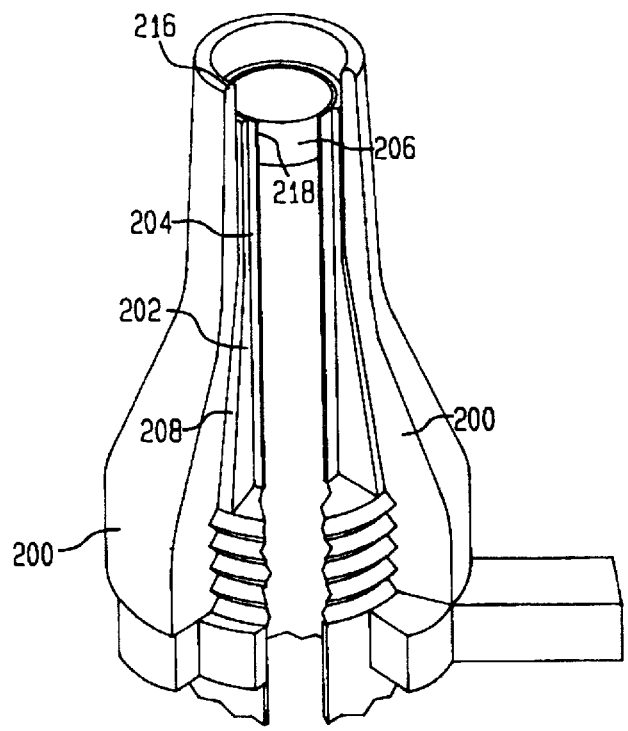
FIG. 2(b) depicts an elevated perspective partial cutaway view of the inventive probe.
Figure 3:
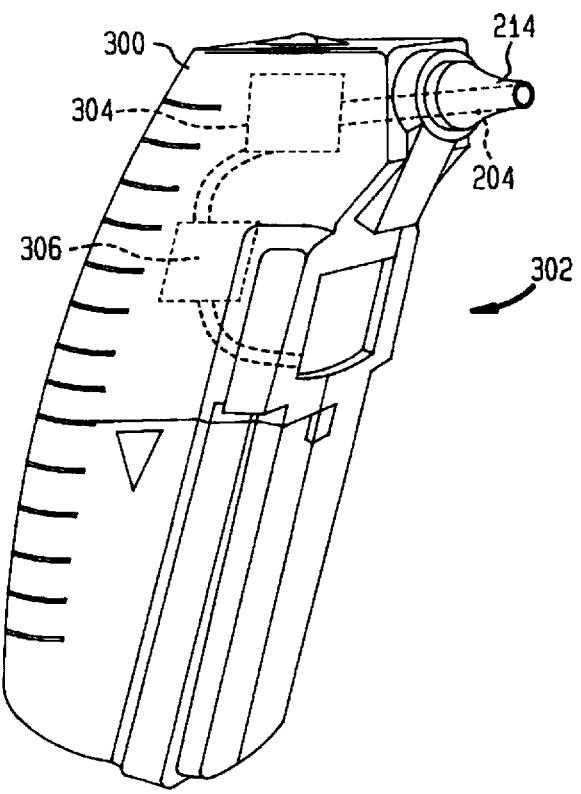
FIG. 3 depicts the inventive probe attached to the body of a tympanic thermometer.

Referring the FIGS. 2(a) and 2(b), the speculum 200, guides and directs the probe's infrared measuring components in the ear channel to an optimal position with respect to the tympanum. The speculum 200 also supports and houses the other probe components. As can be seen from FIGS. 2(a) and 2(b), in a preferred embodiment, the speculum 200 is largely funnel-shaped in cross-section and radially symmetrical, with the seal 202, barrel 204 (or waveguide), and window 206 placed progressively inward from the inner surface 208 of the speculum. The barrel can be composed of metal, and the interior of the barrel has a high reflectivity of infrared radiation; the interior of the barrel is optionally coated with gold. The window can be a cylindrically-shaped rigid window, and can have a ratio of depth to diameter of at least 0.1. The speculum 200 of the invention directly engages the front brick 210 of the thermometer housing 300, preferably by threads 212 to screw onto the brick 210. Mounting the speculum 200 to the front brick 210, which is preferably a sturdy metal bracket, gives the probe 214 additional rigidity such that the mechanical energy created by probe impact with the floor in a fall is directed to the housing 300 of the thermometer, rather than absorbed by the speculum 200 through deformation or passed through the speculum to the barrel 204 and window 206. The barrel 204 and window 206 are sensitive parts whose alignment and integrity are critical to the proper function of the probe 214 and thermometer 302.

To provide additional probe rigidity, the inventive speculum 200 is made of a more rigid material, such as glass reinforced polycarbonate (commonly referred to as fiberglass). In the preferred embodiment, a stiffer and stronger speculum 200 is made of polyetherimide with a 20% glass reinforcement (sold by General Electric under the tradename "ULTEM"), or polycarbonate reinforced with 30% glass. The former and latter, respectively, have been found to withstand repeated nose-first falls of four and three feet onto hard floor surfaces such as ceramic tile. Even after many such repeated "drops," the inventive probe 214 continues to perform as intended and without any loss of accuracy or precision in IR detection and measurement.

Because the barrel 204 or IR waveguide is particularly sensitive of ambient temperature, it is preferably thermally isolated and sealed from the speculum 200. Thermal isolation insures that the ambient thermal energy of the speculum 200 (i.e. its temperature) with not affect the IR measurement taken. In addition, the seal 202 prevents fluids, such as cleaning fluids, from runing down the outside of the waveguide and degrading performance due to evaporative cooling. The inventive seal 202 performs these functions while providing an additional structural function that provides better protection to the probe 214 in the event of a fall.

The inventive seal 202 is a non-solid, compressible and flexible material that absorbs, rather than transfers, speculum flex during a drop. The absorption, rather than transference of the mechanical energy created by a drop and subsequent speculum flex, insures that the barrel 204 will not bend. Barrel bending causes the thermometer 302 to become inaccurate. In the preferred embodiment, the seal material is a 100% silicon, extruded, closed-cell foam tubing with a density of 24 pounds per cubic foot. A suitable such foam is presently available from Specialty silicon Fabricators, Inc. as their formulation number SSF-METD-750.

The IR transmissive window's alignment and integrity are critical for proper operation of the probe 214 and thermometer 302. To enhance the protection of the window 206 from both breakage and misalignment, the window 206 is generally thick for durability. In addition, it is placed wholly within the barrel 204, and away from the rim of the speculum 216 so that in the event of a nose-first fall, both the rim of the speculum 216 and the barrel side walls 218, and surrounding seal 202 all work to protect the window 206. The window 206 is additionally protected by gluing it within the barrel 204 with an adhesive that maintains a resilient hermetic seal between the barrel 204 and the window 206 in the course of typical falls. Preferably the adhesive is injected through two side holes in the barrel to form the hermetic seal. This manner of mounting the window provide good protection for the window 206 without impinging upon part of the optical path. The preferred embodiment employs a urethane-based, single component adhesive curable by either heat or UV light. The uncured viscosity of the adhesive is 300 centipoise. When cured, the adhesive has a modulus (psi) of 160,000, tensile strength (psi) of 3,500, an elongation at failure of 30%, and a shore D hardness of 85. A suitable such adhesive is presently available from Norland Products, as Norland 121.

The thermometer has housing 300 for containment of the operative elements of the device such as the sensor 304 and the electrical circuitry 306. The functional aspects of the non-probe thermometer elements are more fully described in U.S. Pat. No. 4,797,840 to Jacob Fraden, Ph.D., but will be briefly set forth here. The housing 300 supports the front brick 210 and contains a sensor positioned at the barrel end remote from the window 206. Sensor systems may include thermopile types and pyroelectric elements. The sensor is connected to a processor for converting the IR data into a high quality temperature reading. The temperature reading is feed to a viewable display for therapeutic or other use. Housing 300 ideally is shaped for easy grasping and supports an operable switch to signal the devise to read the IR energy from a tympanum.

Persons skilled in the art will understand that various modifications and adaptions of the structure described above may be apparent without departing from the spirit and scope of the invention. Only the claims define the scope of the invention.

We claim:

1. An infrared thermometer for measuring the temperature of the surface of a patient and having improved durability, said thermometer having a sensor responsive to infrared radiation that generates an electrical signal indicative of the temperature of said surface and electrical circuitry for processing the signal into a temperature reading, in which the improvement comprises:

a speculum made of rigid and resilient material externally shaped for reception within a human ear said speculum having a first end capable of placement near a tympanum and a second end wider than a human ear canal;

means for directly mounting the second end of the speculum to a brick attached to a body of the infrared thermometer;

a barrel, disposed axially within the speculum, having an interior with a high reflectivity of infrared radiation; and an infrared transparent, cylindrically-shaped rigid window fixed axially within the barrel by a mounting, said mounting providing a mechanically resilient and hermetic seal between the barrel and the window to mechanically isolate the window from impacts transmitted from the speculum to the barrel, which impacts occur when the thermometer is dropped or similarly shocked.

2. The infrared thermometer of claim 1, further comprising a flexible and non-solid seal disposed radially between an exterior surface of the barrel and an interior surface of the speculum.

3. The infrared thermometer of claim 2 wherein the seal is a closed-cell foam.

4. The infrared thermometer of claim 3 wherein the foam is an extruded tubing of silicon closed-cell foam.

5. The infrared thermometer of claim 1 wherein the rigid and resilient speculum material is polyetherimide with about 20% glass reinforcement.

6. The infrared thermometer of claim 1 wherein the rigid and resilient speculum material is polycarbonate with about 30% glass reinforcement.

7. The infrared thermometer of claim 1 wherein the barrel is made from metal.

8. The infrared thermometer of claim 1 wherein the interior surface of the barrel is coated with gold.

9. The infrared thermometer of claim 1 wherein the window has a ratio of depth to diameter of at least 0.1.

10. The infrared thermometer of claim 1, wherein the window is located wholly inside of the barrel.

11. An infrared thermometer, for measuring the temperature of a patient, and having improved durability, comprising:

a speculum made of rigid and resilient material externally shaped for reception within a human ear and having a first end capable of placement near a tympanum and a second end wider than a human ear canal and having an axis defined between said first end and said second end;

a barrel, disposed axially within the speculum, the barrel having an interior surface with a high reflectivity of infrared radiation;

an infrared transparent cylindrically-shaped rigid window fixed axially within the barrel by a mounting, said mounting providing a mechanically resilient and hermetic seal between the barrel and the window for mechanically isolating the window from impacts transmitted from the speculum to the barrel which impacts occur when the thermometer is dropped or similarly shocked;

a thermometer housing supporting a front brick, and means for directly mounting the second end of the speculum to said brick;

an infrared sensor in optical alignment with said barrel, said sensor carried by said housing and responsive to infrared radiation, coming from said patient whose temperature is to be measured, and passing through said barrel, said sensor generating an electrical signal in response to said radiation; and electrical means carried by said housing and responsive to said signal from said sensor for processing said signal into an indication of the temperature of said patient.

12. The infrared thermometer of claim 11, further comprising a flexible and non-solid seal disposed radially between an exterior surface of the barrel and an interior surface of the speculum, the seal made of a thermally insulating material.

13. The infrared thermometer of claim 11, wherein the window is located wholly inside of the barrel.

14. An infrared thermometer having improved durability, comprising:

a speculum made of glass-reinforced polycarbonate or glass-reinforced polyetherimide and externally shaped for reception within a human ear with a first end capable of placement near a tympanum, and a second end wider than a human ear canal, having screw threads on an interior surface thereof, and having an axis defined between said first end and said second end;

a metal or metalized barrel, disposed axially within the speculum, the barrel having an interior surface with a high reflectivity of infrared radiation;

a thermally insulating closed cell foam seal disposed radially between an exterior surface of the barrel and an interior surface of the speculum;

an infrared-transparent cylindrically-shaped rigid window hermetically and resiliently affixed within the barrel with glue, said glue providing a mechanically resilient and hermetic seal between the barrel and the window for mechanically isolating the window from impacts transmitted from the speculum to the barrel which impacts occur when the thermometer is dropped or similarly shocked;

a thermometer housing including a front brick having screw threads on an exterior surface thereof that threadably engage the screw threads on said interior surface of the second end of the speculum;

an infrared sensor carried by said thermometer housing and generating a signal in response to infrared radiation coming from an object whose temperature is to be measured that passes through said barrel and is received by the sensory; and electrical means carried by said housing and responsive essentially only to said signal for developing an indication of the actual temperature of said object.

15. The infrared thermometer of claim 14, wherein the window is located wholly inside of the barrel.

* * * * *